Patented Aug. 19, 1947

2,425,740

UNITED STATES PATENT OFFICE 2,425,740

REDUCTION OF SULPHATES

Knud Horn, New York, N. Y., assignor to F. L. Smidth & Co., New York, N. Y., a corporation of New Jersey No Drawing. Application July 28, 1943, Serial No. 496,479

9 Claims. (Cl. 23—186)

This invention relates to the decomposition of calcium sulphate with recovery of the calcium content as lime and the driving off of the sulphur content in gaseous form. More particularly, the invention is concerned with a novel process by which calcium sulphate can be decomposed with the production of lime which is practically free of sulphur and may, therefore, be used in operations in which the presence of even a small amount of sulphur is highly objectionable. The new process may be employed in the treatment of calcium sulphate alone and either dehydrated or in the form of gypsum, and it may also be used for the decomposition of calcium sulphate or gypsum mixed with other substances, an example of such a mixture being the solid residue obtained from the spent liquor used in the sulphuric acid pickling of iron or steel, which has been neutralized by means of limestone.

Heretofore much work has been done, especially in Europe, on the decomposition of calcium sulphate, and the patents and published literature contain disclosures of the results of many researches in that field. Most of the investigations appear to have been carried on for the purpose of developing processes for the production of sulphurous acid and, in many instances, the published reports of the research work have been at variance with one another. Thus, according to the researches of one group, gypsum is said to dissociate into lime, $SO_2$, and oxygen between 1000° C. and 1200° C., while another group of workers state that the dissociation requires temperatures between 1400° C. and 1450° C. Still another group at a later date announced that no appreciable dissociation of gypsum occurs at the temperatures mentioned or at considerably higher temperatures.

In the prior processes, of which I am informed, in which the main objective is to obtain as high a yield of $SO_2$ as possible from gypsum, the presence of sulphur in the solid residue appears to be regarded as wholly unimportant. For example, in one process for the production of $SO_2$, a mixture of gypsum and calcium sulphide is heated to temperatures between 1050° C. and 1150° C. and a good yield of the gas is said to be obtained. Theoretically, it is possible to carry on such a reaction, but, as calcium sulphide is not readily decomposable by heat, the practice of the process would produce lime containing a substantial amount of sulphur, unless the process were carried on under laboratory conditions with the calculated amounts of gypsum and calcium sulphide employed. Even then, it would be almost impossible to effect so nearly complete an evolution of $SO_2$ as to obtain a lime which could be used in operations in which the presence of sulphur is objectionable. The process referred to is, therefore, of no practical importance for the decomposition of calcium sulphate to produce lime free of sulphur.

In other proposed processes for the production of sulphurous acid from gypsum, the gypsum is mixed with coke, iron filings, or sulphides of heavy metals and heated to temperatures not to exceed 1200° C. in an atmosphere of an inert gas, such as nitrogen, $CO_2$, and $SO_2$. It has also been proposed to pass a current of $CO_2$ and sulphur vapor over gypsum heated to a temperature of not to exceed 1200° C. and in still another process, the gypsum is heated and subjected to the action of reducing agents and oxidizing agents in rapid alternation. These processes have little practical merit for commercial operation, at least, for the decomposition of calcium sulphate to produce lime free of sulphur, and, so far as I am aware, have not gone into any considerable use.

The present invention is directed to the provision of a process for decomposing calcium sulphate for the production of lime substantially free from sulphur, which can be practiced without close control of temperatures or the use of special inert atmospheres and in either a rotary kiln or a Herreshoff furnace.

In carrying out the new process, a finely divided mixture of calcium sulphate and either elemental sulphur or a sulphide readily decomposable by heat is heated to a temperature of about 2400° F. in the presence of an excess of air, the mixture being preferably nodulized by any of the usual methods prior to burning. Under such burning conditions, a reaction occurs in which the sulphur content of the mixture is driven off in the form of $SO_2$ and the solid residue is substantially free of sulphur. If a decomposable sulphide is employed, the solid residue will also contain an oxide of any metal or base present in the sulphide, so that the choice of the sulphide to be employed in the reaction will be determined by the use to which the solid residue is to be put. Thus, when it is desired to convert the calcium content of the gypsum to lime, uncontaminated by any element other than those present in the starting material, an organic sulphide may be used to advantage, since such a sulphide is converted wholly into gaseous products during the burning reaction. Similarly, elemental sulphur may be used when contamination of the lime is not desired. If the starting material is a mixture of gypsum and other compounds, as, for example, iron oxide, etc., as in the case of solids derived from spent pickle liquor neutralized by limestone, the sulphide employed in the treatment may advantageously be iron sulphide or iron pyrites.

The burning operation of the new process may best be carried on in a rotary kiln fired by gas and with an excess of air supplied in the usual way to insure that the fuel will be wholly consumed. In such a kiln, the mixture is subjected, in accordance with the process, to temperatures in excess of about 2400° F. and preferably the temperature of the operation will be in the range from 2450° F. to about 2550° F., although a slightly higher maximum temperature is not objectionable. Depending on the dimensions of the kiln, the material may be passed through the kiln one or more times, as may be necessary to insure that the reaction is complete.

The amount of sulphide employed in the operation will depend on the kind used and may be calculated from the formula for the reaction. Thus, when a mixture of calcium sulphide and iron pyrites is used, the reaction may be represented by any of the following equations.

$$11CaSO_4 + 2FeS_2 \rightarrow 11CaO + 15SO_2 + Fe_2O_3$$
$$5CaSO_4 + FeS_2 \rightarrow 5CaO + 7SO_2 + FeO$$
$$4CaSO_4 + FeS_2 \rightarrow 4CaO + 6SO_2 + Fe$$

The first equation represents the reaction ordinarily taking place and, for carrying out that reaction, the minimum theoretical amount of iron pyrites required is about 16% of the calcium sulphate, while larger proportions are required in the reactions represented by the second and third equations. It is to be understood that, in the mixture prepared for burning, some excess of the sulphide over the minimum theoretical requirement will ordinarily be employed to facilitate obtaining a complete reaction. The presence of any excess of sulphide is unimportant, since a heat-decomposable sulphide is used and the sulphur content thereof will be evolved during the heating.

When elemental sulphur is employed, the reaction may be represented by the following equation:

$$4CaSO_4 + S_2 \rightarrow 4CaO + 6SO_2$$

In this reaction, the minimum theoretical quantity of elemental sulphur required is about 12% of the calcium sulphate, but I have found that a much less amount of sulphur is required to obtain a lime having a low sulphur content. Thus, when gypsum is heated in the presence of 10% of elemental sulphur, it is possible to obtain lime containing 0.45% in the final product and, with 4% of sulphur, lime containing 0.05% of sulphur is obtained. When 2% of elemental sulphur is added to the gypsum, the resultant lime contains about 0.41%. These results indicate that it is possible to desulphurize calcium sulphate by the use of a much less amount of elemental sulphur than that theoretically required and they also show that a comparatively wide range of sulphur addition can be employed with the amount used selected to produce exhaust gases of the desired concentration. In treating a mixture containing elemental sulphur in less than the calculated amount, it is desirable to heat the mixture to a maximum temperature of about 2600° F.

In the treatment of neutralized spent pickle liquor, the solids obtained therefrom probably consist of calcium sulphate and oxides, sulphates, and basic sulphates of iron, the analysis of a typical material being:

| | Per cent |
|---|---|
| SiO$_2$ | 0.42 |
| Fe$_2$O$_3$ | 15.30 |
| CaO | 32.20 |
| SO$_3$ | 42.56 |

Tests of the new process carried out in connection with such pickle liquor solids have given the following results:

| Mixture | Burning Temperature | Sulphur in Residue |
|---|---|---|
| TEST NO. 1 | | |
| 15 lbs. pickle liquor solids, 1.2 lbs. iron pyrites (FeS$_2$) | ° F. 2,500 | Per cent 0.08 |
| TEST NO. 2 | | |
| 30 lbs. pickle liquor solids, 1.5 lbs. pyrites (FeS$_2$) | 2,550 | 0.04 |
| TEST NO. 3 | | |
| 20 lbs. pickle liquor solids, 10 oz. pyrites (FeS$_2$) | 2,400 | 12.7 |
| TEST NO. 4 | | |
| 20 lbs. pickle liquor solids, 2.2 lbs. pyrites (FeS$_2$) | 2,450 | 0.4 |

From the above tests, it will be apparent that 5 per cent of pyrites on the dry weight of the pickle liquor solids is the minimum amount that can be employed to obtain substantially complete elimination of sulphur. In Test No. 3, the quantity of pyrites was 3.1 per cent and, as shown by the results, the solid residue contained an objectionably large proportion of sulphur. Similarly, it has been found that with pickle liquor solids of the composition above mentioned, the use of pyrites in an amount above 11 per cent results in an increase in sulphur in the final product.

As shown by the analysis of the typical material, the solids contained in neutralized spent pickle liquor contain about 72% CaSO$_4$, so that in Test No. 1, the amount of pyrites used was 8% of the pickle liquor solids or about 11% of the calcium sulphate present therein. In Test No. 2, the amount of pyrites was 5% of the solids or about 7% of the calcium sulphate present, while in Test No. 4, the amount of pyrites was 11% of the solids or about 15% of the calcium sulphate present. The equations previously given for the various reactions between calcium sulphate and iron pyrites indicate that the minimum theoretical amount of pyrites required is more than 16% of the calcium sulphate. The tests thus show that by using an amount of the pyrites substantially less than that required to react with the calcium sulphate as determined by calculation, and heating the mixture at a temperature between 2400° F. and 2600° F., it is possible to obtain a solid residue substantially free from sulphur. The amount of pyrites employed may vary between about 7% and about 15% of the weight of the calcium sulphate, but best results with respect to the absence of sulphur from the residue are obtained when the amount of the pyrites is from about 7% to about 11% of the calcium sulphate.

The equations previously given for the chemical reactions between $CaSO_4$ and sulphides are to be taken as illustrative of how the compounds react when pure compounds are used under ideal conditions. The amount of sulphide required can be reduced in cases in which the gypsum is impure by reason of the presence of compounds having a partially decomposing effect, even though the effect of such compounds is not sufficient to produce complete desulphurizing of the gypsum. As examples of such conditions, it may be mentioned that impure gypsum from natural sources will partly decompose when heated alone in special furnaces and under special burning conditions. Gypsum and iron oxide will also react to a certain extent when heated together. However, in neither of these cases can a complete desulphurizing of the gypsum be obtained. It will be apparent from the foregoing that the amount of sulphides necessary for complete desulphurizing of impure gypsum or materials containing gypsum, such as pickle liquor solids, will have to be determined by pilot tests for each variety of material.

To show the results obtained in the treatment of pickle liquor solids with elemental sulphur and organic sulphides, the following test results are given:

| Mixture | Burning Temperature | Sulphur in Residue |
| --- | --- | --- |
| TEST NO. 5 | | |
| 20 lbs. pickle liquor solids, 2 lbs. 6 oz. sulphur | ° F. 2,500 | Per cent 0.10 |
| TEST NO. 6 | | |
| 10 lbs. pickle liquor solids, 1 lb. of acid sludge (residue from oil refining) | 2,500 | 0.08 |
| TEST NO. 7 | | |
| 20 lbs. pickle liquor solids, 1 lb. 7 oz. carbon bisulphide ($CS_2$) | 2,500 | 0.22 |

In the operations in which the pickle liquor solids are treated with iron pyrites, the iron from the pyrites remains in the solid residue but that is unobjectionable, since the pickle liquor solids also contain iron. The solid residue from such operations, accordingly, contains both lime and iron oxide and is useful as part of a blast furnace charge. In carrying out the operation for the preparation of a product for such furnace use, it may be desirable to employ a sulphide of a metal whose presence would be beneficial in the charge. Sulphides of nickel, manganese, and tungsten are examples of sulphides which may be used for the latter purpose. When elemental sulphur and organic sulphides are used in carrying out the new process, there is no solid residue from the sulphur and sulphides in the final product.

It will be noted that, in the practice of the new process, standard equipment is employed and by using a heat-decomposable sulphide, which may be an organic sulphide, or elemental sulphur and carrying on the reaction at temperatures in excess of about 2400° F., it is possible to obtain a solid residue from which sulphur has been practically completely eliminated. In the practice of the process, the reaction takes place in an atmosphere which is not inert to $SO_2$, as required in certain processes of the prior art, and the temperatures used are also substantially higher than those that have been heretofore recommended for use in processes proposed for the production of $SO_2$. Since heat-decomposable sulphides or elemental sulphur are employed, the presence of an excess of these constituents is not objectionable, because they are driven off during the heating. It is, therefore, not necessary to prepare a mixture containing the ingredients in carefully calculated amounts. Also, it has been found that much less than the theoretical amount of elemental sulphur may be employed in the new process to obtain the desired solid product from which sulphur is absent.

In the following claims, the phrase "sulphides readily decomposable by heat" refers to sulphides, either inorganic or organic, other than those of the alkalis and the alkaline earth metals.

This application is a continuation-in-part of my copending application Serial No. 463,117, filed October 23, 1942.

I claim:

1. A method of decomposing calcium sulphate substantially free of sulphide to produce a solid residue substantially free from sulphur, which comprises preparing a mixture of calcium sulphate and a member of the class consisting of sulphides readily decomposable by heat and elemental sulphur, the amount of the sulphides or elemental sulphur in the mixture being substantially less than the amount required as determined by calculation from the equation for the reaction in which the calcium sulphate is reduced to lime, the total sulphur present is oxidized to $SO_2$, and any metal present as a constituent of a sulphide is oxidized, and heating the mixture in the presence of air at a temperature from about 2400° F. to about 2600° F.

2. A method of decomposing calcium sulphate substantially free of sulphide to produce a solid residue substantially free from sulphur, which comprises preparing a mixture of calcium sulphate and a sulphide readily decomposable by heat, the amount of the sulphide in the mixture being substantially less than the amount required as determined by calculation from the equation for the reaction in which the calcium sulphate is reduced to lime, the total sulphur present is oxidized to $SO_2$, and any metal present as a constituent of the sulphide is oxidized, and heating the mixture in the presence of air at a temperature from about 2400° F. to about 2600° F.

3. A method of decomposing calcium sulphate substantially free of sulphide to produce a solid residue substantially free from sulphur, which comprises preparing a mixture of calcium sulphate and iron pyrites, the amount of the pyrites in the mixture being substantially less than the amount required as determined by calculation from the equation for the reaction in which the calcium sulphate is reduced to lime, the total sulphur is oxidized to $SO_2$, and the iron is oxidized, and heating the mixture in the presence of air at a temperature of about 2400° F. to about 2600° F.

4. A method of decomposing calcium sulphate substantially free of sulphide to produce a solid residue substantially free from sulphur, which comprises preparing a mixture of calcium sulphate and iron pyrites, the amount of the pyrites in the mixture varying from about 7% to about 15% by weight of the calcium sulphate, and heating the mixture in the presence of air at a temperature of about 2400° F. to about 2600° F.

5. A method of decomposing calcium sulphate substantially free of sulphide to produce a solid residue substantially free from sulphur, which comprises preparing a mixture of calcium sulphate and iron pyrites, the amount of the pyrites in the mixture varying from about 7% to about 11% by weight of the calcium sulphate, and heating the mixture in the presence of air at a temperature of about 2400° F. to about 2600° F.

6. A method of decomposing calcium sulphate substantially free of sulphide to produce a solid residue substantially free from sulphur, which comprises preparing a mixture of calcium sulphate and elemental sulphur, the amount of elemental sulphur present being substantially less than the amount required as determined by calculation from the equation for the reaction in which the calcium sulphate is reduced to lime and the total sulphur is oxidized to $SO_2$, and heating the mixture in the presence of air at a temperature of about 2400° F. to about 2600° F.

7. A method of decomposing calcium sulphate substantially free of sulphide to produce a solid residue substantially free from sulphur, which comprises preparing a mixture of calcium sulphate and elemental sulphur, the amount of elemental sulphur present being about 4% by weight of the calcium sulphate, and heating the mixture in the presence of air at a temperature of about 2400° F. to about 2600° F.

8. A method of decomposing neutralized spent sulphuric acid pickle liquor solids substantially free of sulphide and containing calcium sulphate and iron oxides, iron sulphates, and other iron compounds, which comprises preparing a mixture of such solids and a member selected from the group consisting of elemental sulphur and sulphides readily decomposable by heat, the amount of the sulphides or elemental sulphur present in the mixture being substantially less than that required as determined by calculation from the equation for the reaction in which the calcium sulphate is reduced to lime, any metal present as a constituent of a sulphide is oxidized, and the total sulphur present is oxidized to $SO_2$, and heating the mixture in the presence of air at a temperature from about 2400° F. to about 2600° F.

9. A method of decomposing neutralized spent sulphuric acid pickle liquor solid substantially free of sulphide and containing calcium sulphate and iron oxides, iron sulphates, and other iron compounds, which comprises preparing a mixture of such solids and iron pyrites in an amount varying from about 5% to about 8% by weight of the dry solids, and heating the mixture in the presence of air to a temperature from about 2400° F. to about 2600° F.

KNUD HORN.

REFERENCES CITED

The following references are of record in the file of this patent:

UNITED STATES PATENTS

| Number | Name | Date |
|---|---|---|
| 308,289 | Gerrell | Nov. 18, 1884 |

FOREIGN PATENTS

| Number | Country | Date |
|---|---|---|
| 177,613 | Germany | Oct. 30, 1906 |
| 307,772 | Germany | Dec. 29, 1920 |
| 4,201 | Great Britain | 1881 |
| 521,652 | France | Mar. 11, 1921 |
| 377,409 | Germany | June 19, 1923 |
| 356,414 | Germany | July 19, 1922 |
| 161,531 | Great Britain | Sept. 11, 1922 |

OTHER REFERENCES

"Inorganic and Theoretical Chemistry," by Mellor, Longmans, London (1923), vol. 3, page 794. (Copy in Div. 59.)

Certificate of Correction

Patent No. 2,425,740. August 19, 1947.

KNUD HORN

It is hereby certified that error appears in the printed specification of the above numbered patent requiring correction as follows: Column 3, line 23, for "sulphide" read *sulphate*; and that the said Letters Patent should be read with this correction therein that the same may conform to the record of the case in the Patent Office.

Signed and sealed this 21st day of October, A. D. 1947.

[SEAL]

THOMAS F. MURPHY,
*Assistant Commissioner of Patents.*